(12) United States Patent
Bideault

(10) Patent No.: US 7,252,459 B2
(45) Date of Patent: Aug. 7, 2007

(54) METHOD AND DEVICE FOR POSITIONING A BRANCH CONNECTION ON A PIPELINE

(75) Inventor: Jean-Michel Bideault, Meriel (FR)

(73) Assignee: Gaz de France, Paris (FR)

(*) Notice: Subject to any disclaimer, the term of this patent is extended or adjusted under 35 U.S.C. 154(b) by 0 days.

(21) Appl. No.: 11/102,819

(22) Filed: Apr. 11, 2005

(65) Prior Publication Data

US 2005/0238438 A1  Oct. 27, 2005

(30) Foreign Application Priority Data

Apr. 15, 2004  (FR) .................................. 04 03947

(51) Int. Cl.
  *F16L 55/00*  (2006.01)
(52) U.S. Cl. ................................................. 405/184.1
(58) Field of Classification Search ............. 405/154.1, 405/184.1–184.5; 138/89, 92, 155, 140–143, 138/112; 285/21.1, 23, 197–199; 137/15.08, 137/15.13; 29/33 T, 213.1, 890.1; 294/103.1, 294/115

See application file for complete search history.

(56) References Cited

U.S. PATENT DOCUMENTS

| | | | |
|---|---|---|---|
| 2,790,652 A | | 4/1957 | Hoke et al. |
| 4,519,124 A | * | 5/1985 | Burghardt ................ 405/154.1 |
| 4,647,073 A | * | 3/1987 | Kosaka ....................... 285/197 |
| 5,095,564 A | * | 3/1992 | Kruger ....................... 285/197 |
| 6,142,165 A | * | 11/2000 | Wartel et al. ............. 137/15.13 |
| 6,669,406 B2 | * | 12/2003 | Hutton et al. ............. 405/184.1 |
| 7,018,137 B2 | * | 3/2006 | Hutton et al. ............. 405/184.1 |

FOREIGN PATENT DOCUMENTS

| | | | |
|---|---|---|---|
| EP | 736718 | * | 10/1996 |
| EP | 0 762 039 | | 3/1997 |
| FR | 2620649 | * | 3/1989 |
| FR | 2 714 710 | | 7/1995 |
| WO | WO 03/058111 | | 7/2003 |

* cited by examiner

*Primary Examiner*—Sunil Singh
(74) *Attorney, Agent, or Firm*—Young & Thompson

(57) ABSTRACT

The following operations are carried out:
a) digging an exploration hole (8),
b) using a branch connection (10) which includes a main plate (12) and a fixing plate (22) which are held together,
c) using a device (1) which has:
  a support (36)
  retaining elements, (38) which are connected to the support (36),
  a foot (40) which is articulated so as to rotate relative to the support (36),
  actuation elements (44) for displacing the foot (40) between an introduction position and a pressing position,
d) placing the foot (40) in an introduction position,
e) retaining the main plate (12) on the device (1),
f) positioning the support surface (14) of the main plate (12) against the pipeline (2),
g) bringing the foot (40) into a pressing position,
h) fixing the main plate (12) and the fixing plate (22) together around the pipeline (2).

19 Claims, 4 Drawing Sheets

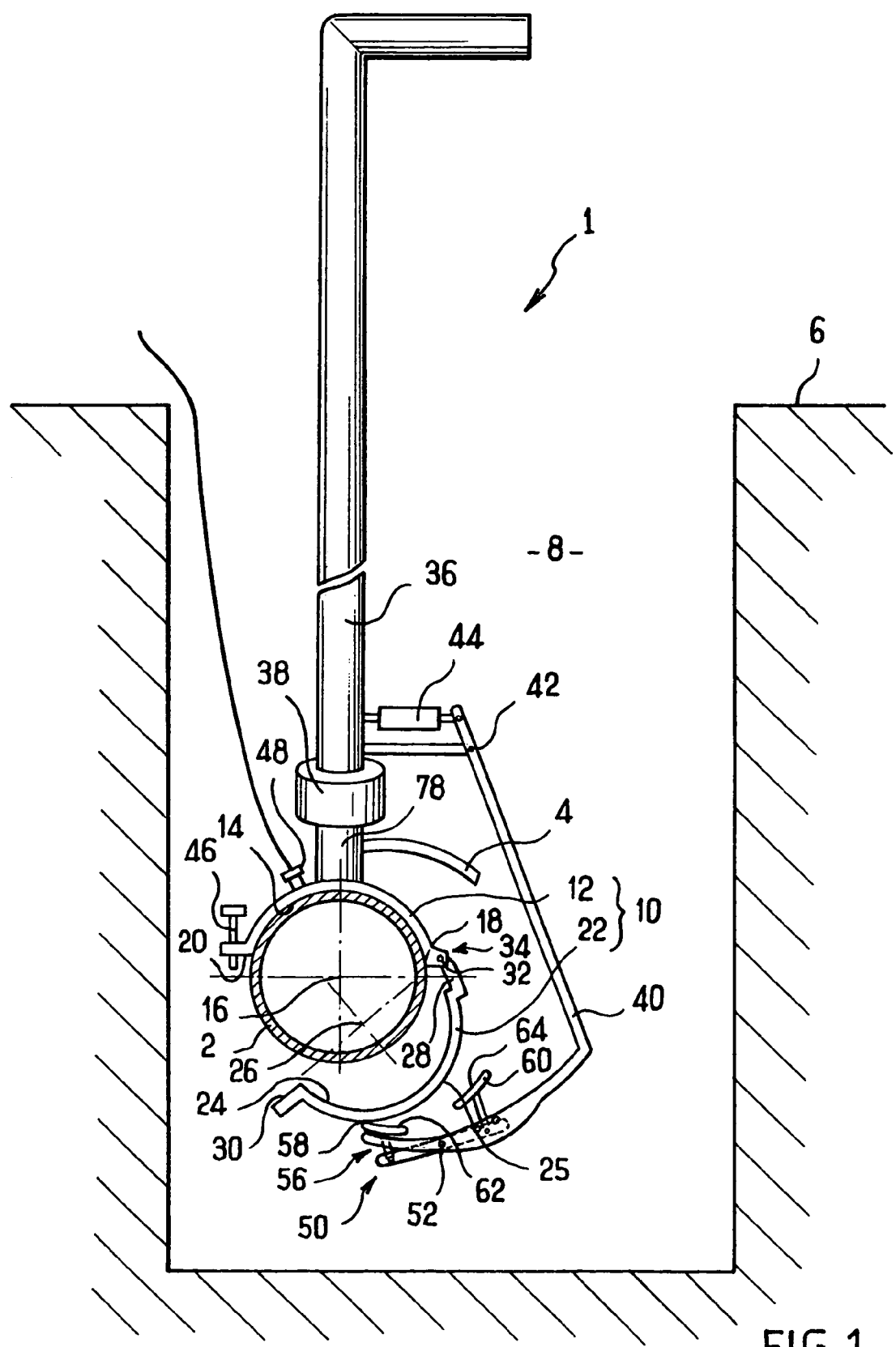
FIG_1

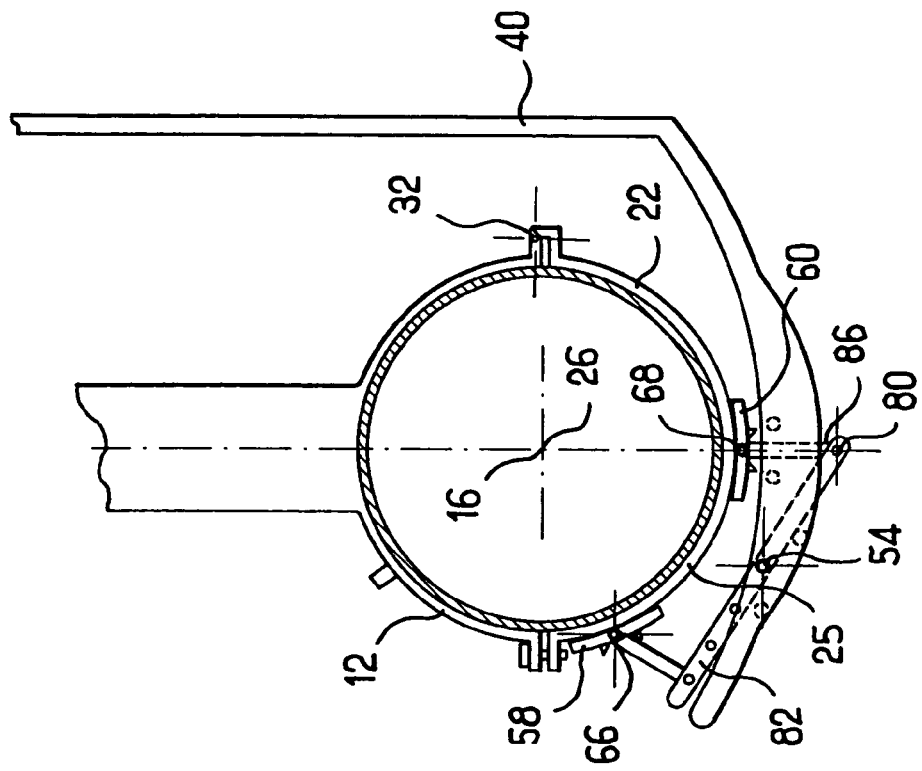
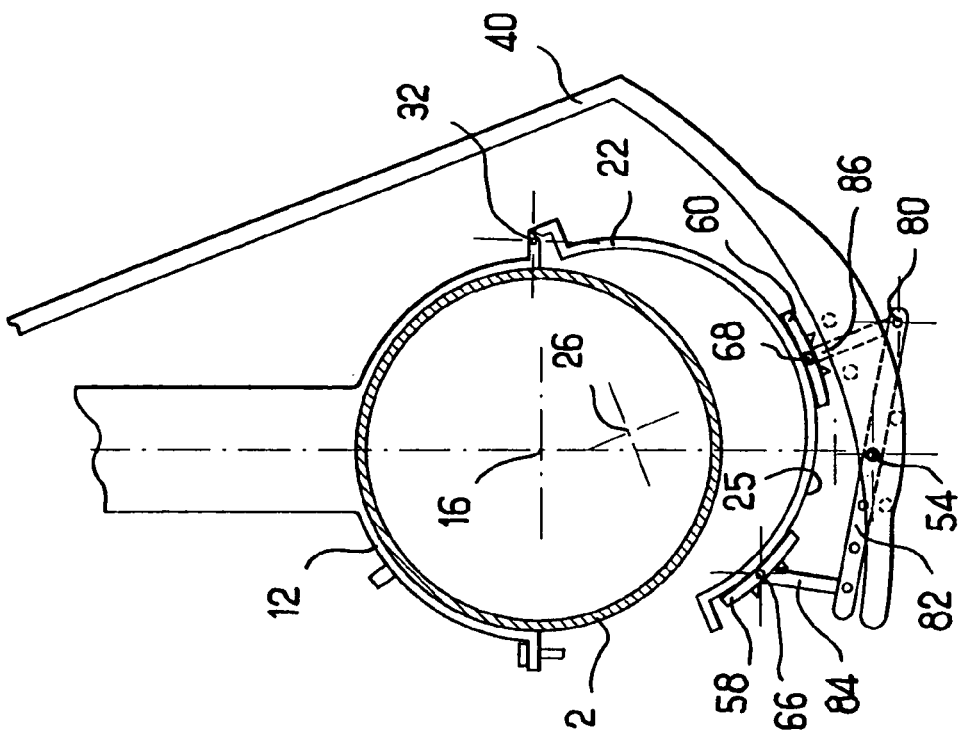

METHOD AND DEVICE FOR POSITIONING A BRANCH CONNECTION ON A PIPELINE

The invention relates to a method for positioning, from ground level, a branch connection on a pipeline and a device intended for this purpose.

BACKGROUND OF THE INVENTION

More precisely, the device is used to position, from the upper portion of an exploration hole which affords access to the pipeline, branch connections on main pipelines in which a fluid, such as in particular gas or water, circulates in order to supply in particular a new residence.

DESCRIPTION OF THE RELATED ART

A positioning device is already known as described in FR-A-2 714 710, in which the following operations are carried out:
digging an exploration hole from the ground in order to open up a portion of the pipeline,
using a branch connection which comprises a plate which has a substantially semi-cylindrical support surface having a circular cross-section defined by an extension axis,
using a device which comprises:
  a support
  retaining means which are connected to the support in order to retain the plate,
  a foot which is articulated so as to rotate relative to the support about an axis of rotation,
  actuation means for displacing the foot in rotation relative to the support between an introduction position and a pressing position,
placing the foot in an introduction position,
retaining the main plate on the device using means for retaining in a position in which the extension axis of the support surface is substantially parallel with the first axis of rotation,
positioning the support surface of the plate against the pipeline,
bringing the foot into a pressing position by operating the actuation means in order to press the plate against the pipeline,
welding the plate to the pipeline,
removing the positioning device, placing the branch connection and the pipeline in communication, removing the positioning device and refilling the exploration hole.

Of course, this method allows a high standard of positioning to be achieved for the branch connections. However, it does require the use of a positioning tool which is heavy, large and costly.

SUMMARY OF THE INVENTION

The invention is intended to facilitate and reduce the cost of positioning a branch connection.

According to the invention, the following operations are carried out:
a) digging an exploration hole from the ground in order to open up a portion of the pipeline,
b) using a branch connection which comprises a main plate and a fixing plate, the main plate and the fixing plate each having a substantially semi-cylindrical support surface which has a circular cross-section defined by an extension axis, a retaining edge and a free edge which extends parallel with the extension axis thereof at one side and the other of the support surface, the extension axes being substantially parallel with each other, the main plate and the fixing plate being held together by the retaining edge thereof, whilst the free edges thereof can be moved relative to each other by means of rotation about an axis which is substantially parallel with the extension axes,
c) using a device which comprises:
  a support,
  retaining means which are connected to the support in order to retain the main plate,
  a foot which is articulated so as to rotate relative to the support about a first axis of rotation,
  actuation means for displacing the foot in rotation relative to the support between an introduction position and a pressing position,
d) placing the foot in an introduction position,
e) retaining the main plate on the device using means for retaining in a position in which the extension axes of the support surfaces are substantially parallel with the first axis of rotation and the fixing plate substantially comes into contact with the foot,
f) positioning the support surface of the main plate against the pipeline,
g) bringing the foot into a pressing position by operating the actuation means in order to press the pipeline between the main plate and the fixing plate,
h) fixing the main plate and the fixing plate together around the pipeline,
i) welding the main plate to the pipeline, removing the positioning device, placing the branch connection and the pipeline in communication and refilling the exploration hole.

The pressure to be applied between the main plate and the pipeline in order to weld the main plate is thus no longer produced by the pressure applied by the positioning tool, but instead by the main plate being fixed to the fixing plate. The positioning device consequently has to apply less force and it can be less robust whilst allowing an excellent standard of positioning to be maintained. The positioning device is thus lighter and smaller. The handling thereof is therefore more simple, which causes the user to become less tired and allows the branch connections to be positioned more quickly and smaller exploration holes to be made. The time saving which is thus brought about compensates to a large extent for the time required to fix the main plate and the fixing plate together.

The presence of the fixing plate does not increase the time required for positioning the branch connection in so far as it is connected to the main plate and is automatically positioned opposite the main plate when the foot is displaced.

Furthermore, it is not necessary to retain the positioning device in position in order to press the main plate onto the pipeline for the entire duration of the electro-welding operation and cooling of the main plate after welding. The positioning device can therefore be removed more quickly in order to position another branch connection. The number of positioning devices required for positioning a given number of branch connections is thus reduced, which results in an additional saving.

Advantageously, during step g), the free edges of the main plate and the fixing plate are brought close to each other and, during step h), the free edges of the main plate and the fixing plate are screwed together. Fixing the main plate and the fixing plate is thus simplified. Furthermore, it allows high levels of pressure to be applied between the main plate and the pipeline.

The invention further relates to a device. According to the invention, the device comprises:

a support, retaining means which are connected to the support in order to retain the main plate, a foot which is articulated so as to rotate relative to the support about a first axis of rotation, actuation means for displacing the foot in rotation relative to the support between an introduction position and a pressing position, a support element, means for articulating in rotation about a second axis of rotation which is substantially parallel with the first axis of articulation, said articulation means being arranged between the support element and the foot, said support element being intended to come into contact with the fixing plate in order to bring it into contact with the pipeline.

The fixing plate is thus precisely guided relative to the main plate and is positioned precisely opposite the main plate when the foot is displaced.

In order to allow the support element to be automatically positioned by means of rotation about the second axis of rotation in order to provide the most effective guiding for the fixing plate, according to the invention, the support element comprises a base, a first skid-like member which has a first support surface and a second skid-like member which has a second support surface, the support surfaces defining a divergent shape, the skid-like members being connected to the base, the base pivoting relative to the foot about the second axis of rotation, by means of the articulation means.

It is thus not necessary to provide means for controlling the rotation of the support element relative to the foot by means of rotation about the second axis of rotation in accordance with the rotation of the foot relative to the support about the first axis of rotation, since this is carried out automatically in an optimal manner.

The two skid-like members allow two contact surfaces to be provided on the fixing plate spaced from each other, which promotes the guiding action.

According to another feature in accordance with the invention, the first skid-like member is mounted so as to pivot relative to the base about a third axis of rotation which is substantially parallel with the first axis of rotation. The contact surface and the relative sliding between the first skid-like member and the fixing plate are increased, which further improves the bringing about of satisfactory positioning of the fixing plate relative to the main plate.

So that these advantages are even more evident, according to the invention, the second skid-like member is mounted so as to pivot on the base about a fourth axis of rotation which is substantially parallel with the first axis of rotation.

In order to be able to adapt to a wide range of branch connections, which correspond in particular to various pipeline diameters, the support element comprises adjustment means for translating the first skid-like member radially relative to the second axis of articulation.

According to a feature in accordance with the invention, the device further comprises means for limiting the extent of the rotation movements of the support element relative to the foot.

The extent of useful rotation of the support element relative to the foot whilst the foot pivots relative to the support is not very great (a few tens of degrees at the very most). Consequently, by limiting the rotation of the support element relative to the foot to movements of relatively small extent, it is made more efficient in terms of guiding the fixing plate and easier to handle.

In order to be able to position various models of branch connection and in particular to be able to position branch connections on pipelines of different diameters, according to the invention, the first axis of rotation comprises a plurality of adjustment positions on the foot.

And in particular, according to the invention, an assembly which comprises, in addition to the device, a branch connection comprising a main plate and a fixing plate is as in the pressing position:

the main plate and the fixing plate each have a semi-cylindrical support surface having a circular cross-section defined by an extension axis, and the extension axis of the fixing plate is substantially aligned with the extension axis of the main plate, the extension axis of the main plate and the extension axis of the fixing plate extend substantially in a plane defined by the first axis of rotation and the second axis of rotation.

When the device is close to the pressing position, if the displacement of the support element relative to the pipeline is broken down into a radial component and a tangential component, it can thus be seen that the radial component is much larger than the tangential component, the corresponding forces being inversely proportional; this allows the force produced by the actuation means to be reduced for a given pressure applied to the pipeline, further improves the positioning of the fixing plate and reduces the impact when the fixing plate comes into contact with the pipeline. The device can therefore be more robust, less costly and the standard of positioning can be improved.

BRIEF DESCRIPTION OF THE DRAWINGS

The invention will be appreciated even more clearly from the following description, given with reference to the appended drawings, in which:

FIG. 1 is a schematic illustration of a first method step for positioning a branch connection on a pipeline according to the invention, FIG. 2 illustrates a second method step, drawn to an enlarged scale, FIG. 3 illustrates a third method step, also drawn to an enlarged scale.

DESCRIPTION OF THE PREFERRED EMBODIMENTS

Figure 5:
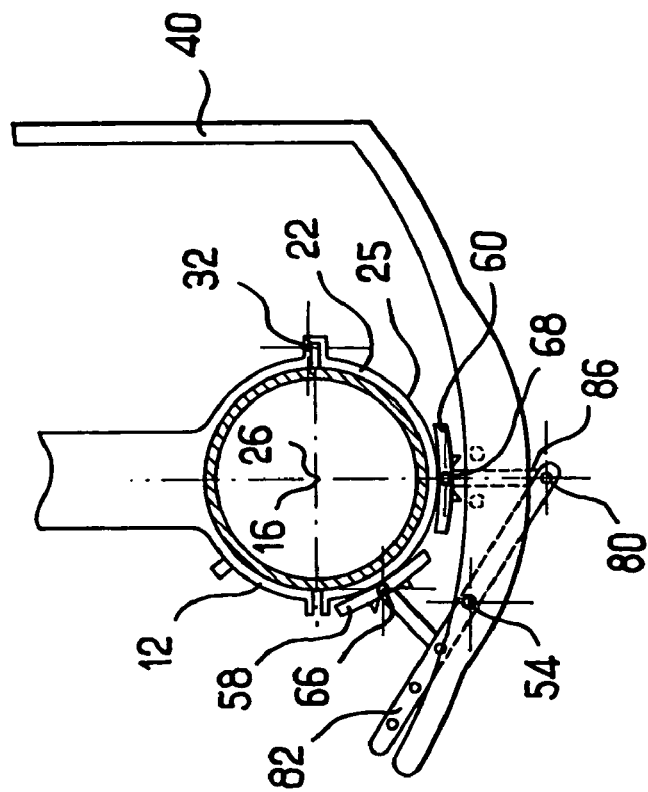
FIG. 5 illustrates the third method step for positioning a branch connection on the pipeline of FIG. 4.

The Figures illustrate a device 1 which substantially comprises a support 36, a foot 40 which is articulated so as to rotate relative to the support 36 about a first axis of rotation 42 (perpendicular relative to the plane of the Figures), a jack 44 and a support element 50.

Figure 6:
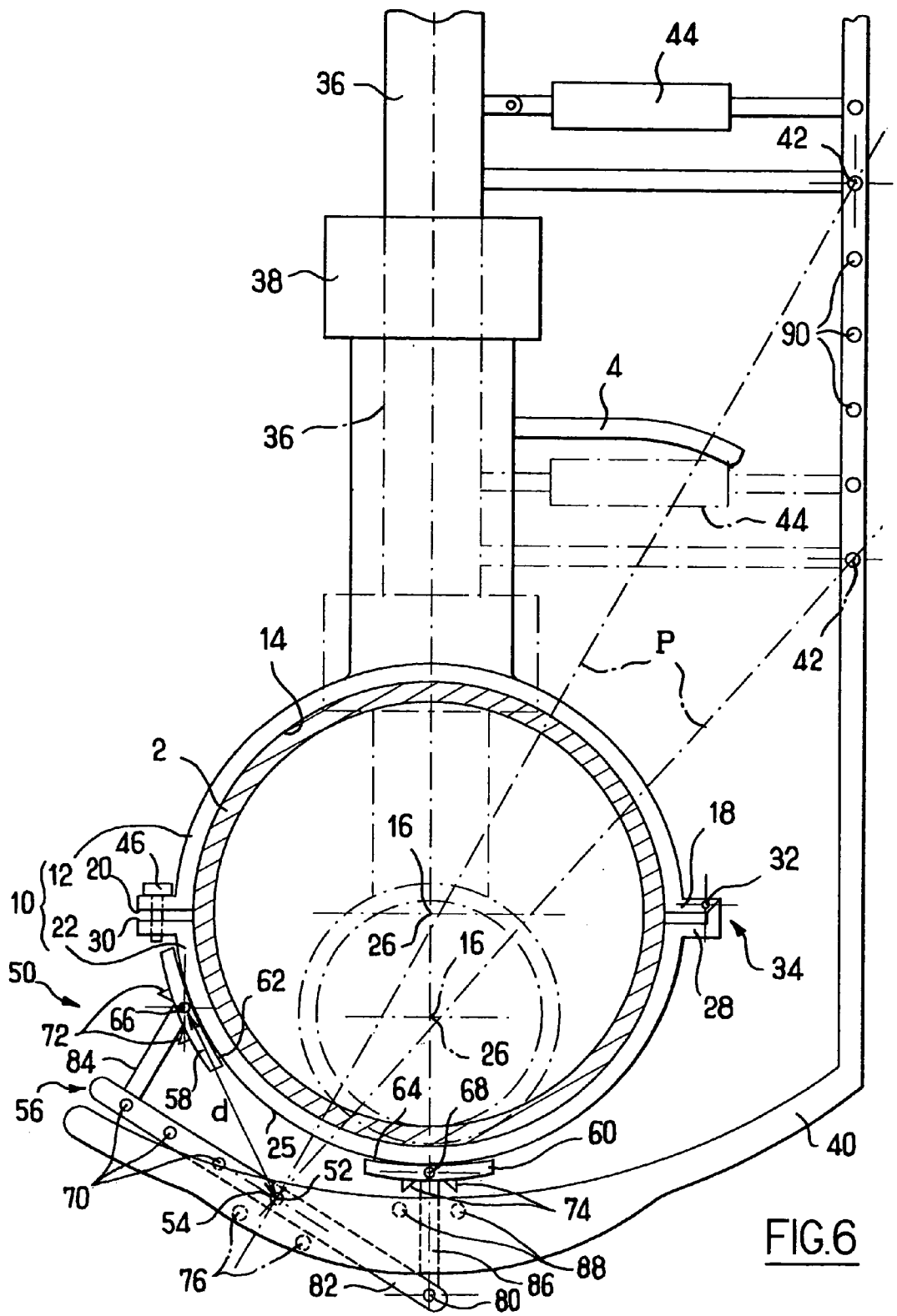
FIG. 6 is a superimposed view of the third method step according to FIGS. 3 and 5.

The jack 44 extends between the support 36 and the foot 40 in order to displace the foot between an introduction position illustrated in FIG. 1 and a pressing position illustrated in FIGS. 3, 5 and 6.

The device 1 further comprises an adaptor 38 which is connected to the support 36 in a releasable manner and which is screwed to the end of the shaft 78 of a main plate 12 of a connection of a branch connection 10.

The main plate 12 has a substantially semi-cylindrical support surface 14 which has a circular cross-section having an extension axis 16, a retaining edge 18 and a free edge 20. The retaining edge 18 and the free edge 20 are arranged at one side and the other of the support surface 14 and extend along the extension axis 16. The shaft 78 extends substantially perpendicularly relative to the extension axis 16 and has an inner passage which opens in the support surface 14, substantially perpendicularly relative to the surface. The inner passage communicates with a branch pipe 4 which is intended to be connected to the new branching point.

The branch connection 10 further comprises a fixing plate 22. The fixing plate 22 has a substantially semi-cylindrical support surface 24 and outer surface 25 which have a circular cross-section having an extension axis 26, a retaining edge 28 and a free edge 30. The support surface 24 of the fixing plate substantially complements the support surface 14 of the main plate. The retaining edge 28 and the free edge 30 are arranged at one side and the other of the support surface 24 and the outer surface 25. They extend substantially along the extension axis 26.

The fixing plate 22 is articulated so as to rotate relative to the main plate 12 about an axis of articulation 32 by means of an articulation 34 of the cap type, which joins together the retaining edge 18 of the main plate and the retaining edge 28 of the fixing plate. The axis of articulation 32 is substantially parallel with the extension directions 16, 26.

In order to position a branch connection 10 on a pipeline 2, the branch connection 10 is connected to the branch pipe 4, the device 1 is placed in the introduction position, and the branch connection 10 is retained on the device 1, by means of the adapter 38, in such a position that the extension axes 16, 26 and the axis of articulation 32 are arranged substantially parallel with the first axis of rotation 42. The outer surface 25 of the lower plate 22 then substantially comes into contact with the support element 50.

As illustrated more precisely in FIG. 6, the support element 50 comprises a base 56, a first skid-like member 58 and a second skid-like member 60. The base 56 comprises a transverse element 82, a first intermediate element 84 and a second intermediate element 86. The transverse element 82 is articulated so as to rotate relative to the foot 40 by means of a rod 52 which is retained in the foot 40 and which extends through an opening made in the transverse element 82. This rod 52 extends along a second axis of rotation 54 (perpendicular relative to the plane of the Figures) substantially parallel with the first axis of rotation 42. Stops 76 are provided on the foot 40 in order to limit the extent of rotation of the transverse element 82 relative to the foot 40.

The first skid-like member 58 has a concave support surface 62. It is mounted so as to pivot about a third axis of rotation 66, substantially parallel with the first axis of rotation 42, on the first intermediate element 84. Wedges 72 are arranged on the first skid-like member 58 at the side opposite the support surface 62, close to the third axis of rotation 66, in order to limit the extent of the rotation of the first skid-like member relative to the first intermediate element 84.

The first intermediate element 84 is fixed in a releasable manner to the transverse element 82. It can be fixed to the transverse element 82 at various adjustment points 70 which are arranged in a radial direction relative to the second axis of rotation 54 in order to be able to modify the distance d between the third axis of rotation 66 and the second axis of rotation 54.

The second skid-like member 60 has a concave support surface 64. It is mounted so as to pivot about a fourth axis of rotation 68, substantially parallel with the first axis of rotation 42, on the second intermediate element 86. Wedges 74 are arranged on the second skid-like member 60, at the side opposite the support surface 64, close to the fourth axis of rotation 68, in order to limit the extent of the rotation of the second skid-like member 60 relative to the second intermediate element 86.

The second intermediate element 86 is mounted so as to pivot about a fifth axis of rotation 80, substantially parallel with the first axis of rotation 42, on the transverse element 82. Stops 88 are provided on the foot 40 in order to guide the second intermediate element 86 relative to the foot 40 and limit the extent of the rotation thereof about the fifth axis of rotation 80.

The distance d between the third axis of rotation 66 and the second axis of rotation 54 is adjusted in accordance with the diameter of the pipeline 2.

The ability of the support element 50 to move in rotation about the second axis of rotation 54, the third axis of rotation 66, the fourth axis of rotation 68 and the fifth axis of rotation 80, as well as the various means 76, 72, 74, 88 for limiting the extent of rotation about these axes of rotation allow the support surfaces 62, 64 to be effectively positioned on the outer surface 25 of the fixing plate 22. These support surfaces 62, 64 define a divergent shape.

After having dug an exploration hole 8 from the ground 6 in order to open up a portion of the pipeline 2, the device 1, with the main plate 12 retained on the support 36 by means of the adaptor 38, is lowered into the exploration hole 8, with the foot 40 in the introduction position.

The support surface 14 of the main plate 12 is positioned against the pipeline 2, the foot 40 is then brought into a pressing position by means of rotation about the first axis of rotation 42, with the jack 44 being operated.

The first skid-like member 58 and the second skid-like member 60 automatically move in order to guide the outer surface 25 of the fixing plate 22 most effectively in terms of rotation thereof about the axis of articulation 32, until the free edge 30 thereof is moved opposite the free edge 20 of the main plate 12 and they press the pipeline 2 between the main plate 12 and the fixing plate 22.

FIG. 6 illustrates the positioning device with the foot 40 in the pressing position. The pipeline 2 illustrated in FIGS. 2 and 3 is illustrated with solid lines in this FIG. 6, whilst the pipeline 2 which has a smaller diameter and which is illustrated in FIGS. 4 and 5 is illustrated with dot-dash lines (mixed) in this FIG. 6.

As illustrated, the first axis of rotation 42 has a plurality of adjustment positions 90 on the foot 40 in order to adapt to the different diameters of pipeline.

Figure 4:
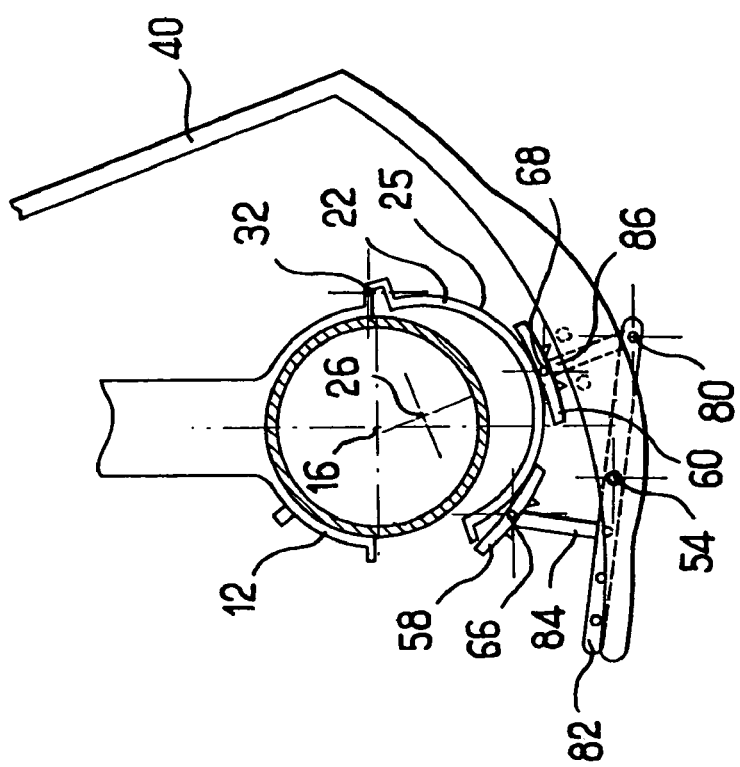
FIG. 4 illustrates the second method step according to FIG. 2, with a pipeline having a smaller diameter.

The position of the support 36 and the jack 44 in the case of the pipeline 2 illustrated in FIGS. 4 and 5 is illustrated with dot-dash lines (mixed).

When the foot 40 is in a pressing position, the extension axes 16, 26 of the main plate 12 and the fixing plate 22 are substantially aligned and extend close to the plane P which extends through the first axis of rotation 42 and the second axis of rotation 54, regardless of the diameter of the pipeline 2.

The free edge 20 of the main plate 12 is then fixed to the free edge of the fixing plate 22 using fixing screws 46.

The foot 40 is then brought into an introduction position and removed from the exploration hole 8, with the adaptor 38 being uncoupled from the support 36.

The adapter is then removed by being unscrewed from the end of the shaft 78 of the main plate.

The main plate 12 is then welded onto the pipeline by means of an electrical resistor (not shown) embedded in the main plate 12 close to the support surface 14 and electrical connectors 48. The branch pipe 4 is then placed in communication with the pipeline 2 via the shaft 78 by the pipeline 2 being drilled, advantageously by means of a perforator which is integrated in the shaft 78. Finally, the exploration hole 8 is refilled.

Advantageously, the pipeline 2 has a diameter of substantially between 50 millimetres and 250 millimetres, the branch connection 10 and the pipeline being of plastics material, such as polyethylene.

Of course, the invention is by no means limited to the construction which has been described above by way of non-limiting example. Provision could thus be made for the fixing plate 22 to be relatively flexible about a flexion direction which is substantially parallel with the extension axis 26 thereof and for the articulation 34 between the main plate and the fixing plate to be dispensed with. The axis of articulation 32 between the main plate 12 and the fixing plate 22 would then be defined by said flexion direction.

The invention claimed is:

1. A device for positioning, from the level of the ground (6), a branch connection (10) on a pipeline (2), the branch connection (10) comprising a main plate (12) and a fixing plate (22), the main plate (12) and the fixing plate (22) each having a substantially semi cylindrical support surface (14, 24) which has a circular cross-section defined by an extension axis (16, 26), a retaining edge (18, 28) and a free edge (20, 30) which extends parallel with the extension axis (16, 26) thereof at one side and the other of the support surface (14, 24), the extension axes (16, 26) being substantially parallel with each other, the main plate (12) and the fixing plate (22) being held together by the retaining edge (18, 28) thereof, whilst the free edges (20, 30) thereof can be moved relative to each other by means of rotation about an axis of articulation (32) which is substantially parallel with the extension axes (16, 26), the device comprising:
   a support (36),
   retaining means (38) connected to the support (36) in order to retain the main plate (12) in a position in which the extension axes (16, 26) of the support surfaces (14, 24) are substantially parallel with the first axis of rotation (42) and the fixing plate (22) substantially comes into contact with the foot (40),
   a foot (40) articulated to rotate relative to the support (36) about a first axis of rotation (42),
   actuation means (44) for displacing the foot (40) in rotation relative to the support (36) between an introduction position and a pressing position in which the pipeline (2) is pressed between the main plate (12) and the fixing plate (22),
   a support element (50), and
   means (52) for articulating in rotation about a second axis of rotation (54) which is substantially parallel with the first axis of rotation (42), said articulation means (52) being arranged between the support element (50) and the foot (40), said support element (50) configured to come into contact with the fixing plate (22) in order to bring the fixing plate into contact with the pipeline (2).

2. The device according to claim 1, wherein, the support element (50) comprises a base (56), a first skid-like member (58) which has a first support surface (62) and a second skid-like member (60) which has a second support surface (64), the support surfaces (62, 64) defining a divergent shape, the skid-like members (58, 60) being connected to the base (56), the base (56) pivoting relative to the foot (40) about the second axis of rotation (54), by means of the articulation means (52).

3. The device according to claim 2, wherein, the first skid-like member (58) is mounted so as to pivot relative to the base (56) about a third axis of rotation (66) which is substantially parallel with the first axis of rotation (42).

4. The device according to claim 3, wherein, the second skid-like member (60) is mounted so as to pivot on the base (56) about a fourth axis of rotation (68) which is substantially parallel with the first axis of rotation (42).

5. The device according to claim 4, wherein, the support element (50) comprises adjustment means (70) for translating the first skid-like member radially relative to the second axis of articulation (54).

6. The device according to claim 4, wherein, the device (1) further comprises means (72, 74) for limiting the extent of the rotation movements of the support element (50) relative to the foot (40).

7. The device according to claim 3, wherein, the support element (50) comprises adjustment means (70) for translating the first skid-like member radially relative to the second axis of articulation (54).

8. The device according to claim 3, wherein, the device (1) further comprises means (72, 74) for limiting the extent of the rotation movements of the support element (50) relative to the foot (40).

9. The device according to claim 2, wherein, the support element (50) comprises adjustment means (70) for translating the first skid-like member radially relative to the second axis of articulation (54).

10. The device according to claim 9, wherein, the device (1) further comprises means (72, 74) for limiting the extent of the rotation movements of the support element (50) relative to the foot (40).

11. The device according to claim 2, wherein, the device (1) further comprises means (72, 74) for limiting the extent of the rotation movements of the support element (50) relative to the foot (40).

12. The device according to claim 1, wherein, the device (1) further comprises means (72, 74) for limiting the extent of the rotation movements of the support element (50) relative to the foot (40).

13. The device according to claim 1, wherein, the first axis of rotation (42) comprises a plurality of adjustment positions (90) on the foot (40).

14. An assembly comprising the device (1) according to claim 13 and a branch connection (10) which comprises a main plate (12) and a fixing plate (22), characterised in that, in the pressing position:
   the main plate (12) and the fixing plate (22) each have a semi-cylindrical support surface (14, 24) having a circular cross-section defined by an extension axis (16, 26), and the extension axis (26) of the fixing plate (22) is substantially aligned with the extension axis (16) of the main plate (12),
   the extension axis (16) of the main plate (12) and the extension axis (26) of the fixing plate (22) extend substantially in a plane (P) defined by the first axis of rotation (42) and the second axis of rotation (54).

15. A positioning device for positioning a branch connection (10) on a pipeline (2) from ground level, the device comprising:
   a support (36);
   a retaining means (38) connected to the support (36) and configured to engage a branch connection (10) comprising a main plate (12) and a fixing plate (22), the main plate (12) and the fixing plate (22), each of the main plate and fixing plate having a substantially semi cylindrical support surface (14, 24) with a circular cross-section defined by an extension axis (16, 26), a retaining edge (18, 28) and a free edge (20, 30) extending parallel with the extension axis (16, 26) thereof at one side and the other of the support surface (14, 24), the extension axes (16, 26) being substantially parallel with each other, the main plate (12) and the fixing plate (22) being held together by the retaining edge (18, 28) thereof, the free edges (20, 30) thereof movable relative to each other by rotation about an axis of articulation (32) which is substantially parallel with the extension axes (16, 26), the retaining means further configured to retain the main plate (12) in a position in which the extension axes (16, 26) of the support surfaces (14, 24) are substantially parallel with the first axis of rotation (42) and the fixing plate (22) substantially comes into contact with the foot (40);

a foot (40) articulated to rotate relative to the support (36) about a first axis of rotation (42);

an actuator (44) for displacing the foot (40) in rotation relative to the support (36) between an introduction position and a pressing position in which the pipeline (2) is pressed between the main plate (12) and the fixing plate (22);

a support element (50) connected to the foot; and an articulator (52) arranged between the support element (50) and the foot (40) for articulating in rotation about a second axis of rotation (54) which is substantially parallel with the first axis of rotation (42), said support element (50) configured to come into contact with the fixing plate (22) in order to bring the fixing plate into contact with the pipeline (2).

16. The device of claim 15, wherein, the support element (50) comprises a base (56) pivoting, via the articulator, relative to the foot (40) about the second axis of rotation (54), and a first skid member (58) with a first support surface (62) and a second skid member (60) with a second support surface (64) connected to the base, the first and second support surfaces (62, 64) define a divergent shape, the first skid member (58) is mounted to pivot relative to the base (56) about a third axis of rotation (66) substantially parallel with the first axis of rotation (42), the second skid member (60) is mounted to pivot on the base (56) about a fourth axis of rotation (68) substantially parallel with the first axis of rotation (42).

17. The device of claim 16, wherein, the support element (50) comprises adjustment a part (70) translating the first skid member radially relative to the second axis of articulation (54).

18. The device of claim 17, further comprising:

parts (72, 74) limiting an extent of the rotation movements of the support element (50) relative to the foot (40); and a plurality of adjustment positions (90) on the foot (40) with respect to the first axis of rotation (42).

19. The device of claim 15, further comprising:

parts (72, 74) limiting an extent of the rotation movements of the support element (50) relative to the foot (40); and a plurality of adjustment positions (90) on the foot (40) with respect to the first axis of rotation (42).

* * * * *